United States Patent
Wortel

[11] Patent Number: 5,562,334
[45] Date of Patent: Oct. 8, 1996

[54] BEAM-COMBINING DEVICE AND COLOR IMAGE PROJECTION APPARATUS PROVIDED WITH SUCH A DEVICE

[75] Inventor: Franciscus J. M. Wortel, Eindhoven, Netherlands

[73] Assignee: U.S. Philips Corporation, New York, N.Y.

[21] Appl. No.: 435,309

[22] Filed: May 5, 1995

[30] Foreign Application Priority Data

May 6, 1994 [EP] European Pat. Off. ............ 94201261

[51] Int. Cl.$^6$ ................................................. G03B 21/00
[52] U.S. Cl. ................................................. 353/69; 353/37
[58] Field of Search ............................ 353/31, 34, 37, 353/22, 69, 98, 99; 348/757, 780; 359/618, 629, 634, 637, 639

[56] References Cited

U.S. PATENT DOCUMENTS

| | | | |
|---|---|---|---|
| 3,253,505 | 5/1966 | Miller | 353/70 |
| 4,615,595 | 10/1986 | Hornbeck | 353/122 |
| 4,754,272 | 6/1988 | Illenberg et al. | 340/815.1 |
| 4,969,730 | 11/1990 | Van Den Brandt | 353/31 |
| 5,046,837 | 9/1991 | Stroomer et al. | 353/82 |
| 5,084,807 | 1/1992 | McKechnie et al. | 362/228 |
| 5,231,431 | 7/1993 | Yano et al. | 353/69 |

FOREIGN PATENT DOCUMENTS

| | | |
|---|---|---|
| 0527343 | 7/1991 | Japan . |
| 3170925 | 7/1991 | Japan . |
| 4125536 | 4/1992 | Japan . |
| 527343 | 2/1993 | Japan . |

*Primary Examiner*—William Dowling
*Attorney, Agent, or Firm*—Michael J. Balconi-Lamica

[57] ABSTRACT

An optical device for combining at least two sub-beams ($b_G$, $b_R$, $b_B$) of different colours to one colour beam ($b_C$) is described, which device comprises at least one colour-selective reflector which is arranged on a transparent plate-shaped substrate. By using a correction element composed of a first sub-element chosen from the group of cylindrical lens and obliquely arranged spherical lens, and a second sub-element chosen from the group of plane-parallel plate, wedge and prism, aberrations caused by the substrate in a sub-beam can be corrected.

19 Claims, 6 Drawing Sheets

BEAM-COMBINING DEVICE AND COLOR IMAGE PROJECTION APPARATUS PROVIDED WITH SUCH A DEVICE

BACKGROUND OF THE INVENTION

1. Field of the Invention

The invention relates to an optical device for combining at least two sub-beams of different colours to one colour beam, which device comprises at least one colour-selective reflector arranged on a transparent plate-shaped substrate and which is further provided with at least one correction element arranged in the path of a sub-beam, which has traversed the substrate, for compensating astigmatism introduced by this substrate in the relevant sub-beam.

A device of this type may be used, for example in a colour image projection apparatus for combining three sub-beams emitted by three primary image sources generating three monochromatic images, each in a different colour, of one and the same scene to one colour beam which is applied to one projection lens system. Thus, the three monochromatic images can be projected as one image on a projection screen.

2. Discussion of the Related Art

A device for combining three differently coloured sub-beams emitted by three liquid crystalline picture display panels, hereinafter referred to as LCD panels, is described, inter alia in U.S. Pat. No. 5,046,837. This device comprises two colour-selective reflectors in the form of dichroic mirrors, each arranged on a glass substrate. One of the sub-beams, for example the green beam is reflected by the two mirrors while the two other sub-beams, the red and the blue beam are reflected once by a dichroic mirror and pass the substrate of a mirror once. Since these mirrors are arranged obliquely in the three beams, for example at an angle of 45° to the axis of the sub-beams and the sub-beams are converging beams at the area of the mirrors, a sub-beam passing through the substrate of a mirror will become astigmatic, which means that this beam has different convergences in two mutually perpendicular planes comprising the beam axis. Consequently, the beam will not be sharply focused on the projection screen in said two planes so that the projected image exhibits an aberration. Since the mirrors are arranged in an imaging optical system, they should have a high degree of planeness, which can only be achieved by making use of relatively thick substrates so that said astigmatism is relatively large. This astigmatism only occurs in two of the three sub-beams. Consequently, the distortion in the projected colour image cannot be corrected by one correction element in the path of the combined beam.

In (JP-A) 3-170925 it is proposed to eliminate the aberration by arranging a cylindrical lens on each of the mirror substrates opposite the dichroic layer. As is known, a cylindrical lens introduces astigmatism in a beam. By suitable choice of the power and position of the cylindrical lens, the astigmatism caused thereby may compensate the astigmatism caused by an oblique passage of a beam through a plate. However, only the astigmatism and no other aberration produced upon passage through a plate, inter alia coma, can be corrected with such a cylindrical lens.

SUMMARY OF THE INVENTION

It is an object of the present invention to provide a correction element with which a full correction of beam aberrations can be realised and to provide further possibilities for using such a correction element.

The device according to the invention is characterized in that the correction element comprises a first sub-element chosen from the group of cylindrical lens, obliquely arranged spherical lens, and a second sub-element chosen from the group of plane-parallel plate, wedge, prism, which sub-elements jointly correct for aberrations such as at least astigmatism and coma introduced by the substrate traversed by the sub-beam.

The first sub-element has such a matched power and position that the distance between the astigmatic focal lines produced upon passage through this element is of equal magnitude but of opposite sign as compared with the distance between the astigmatic focal lines produced upon passage through the substrate of the reflector. The coma produced upon passage through the reflector substrate is corrected by the second sub-element.

The first and the second sub-element may be separate elements.

A preferred embodiment of the device is, however, characterized in that the first and the second sub-element are integrated to one element.

Consequently, possible false reflections are limited to a minimum and, moreover, the manufacture of the correction element and the assembly of the device will be simpler.

There are different possibilities as regards the mutual positioning of the sub-elements in the integrated element.

A first embodiment is characterized in that the first and the second sub-element are arranged on opposite sides of the integrated element.

A second embodiment is characterized in that the first and the second sub-element are superimposed on one and the same surface of the integrated element.

There are also different possibilities as regards the positioning of the sub-elements with respect to the reflector substrate for which a correction must be made.

A first possibility is realised in an embodiment which is characterized in that the first sub-element is arranged closer to the reflector substrate for which a correction must be made than the second sub-element.

A second possibility is realised in an embodiment which is characterized in that the second sub-element is arranged closer to the reflector substrate for which a correction must be made than the first sub-element.

In the embodiment in which the first and the second sub-element are integrated on one and the same surface of the integrated element, this surface may either face the reflector substrate for which a correction must be made or be remote from this substrate.

A special embodiment of the device is characterized in that the first sub-element is a cylindrical lens and the second sub-element is an optical wedge.

This embodiment may be further characterized in that, viewed from the reflector substrate for which a correction must be made, the cylindrical surface is convex, and in that the cylindrical axis is perpendicular to a plane through an optical axis of the device, in which plane the reflector extends at an acute angle to the optical axis.

Alternatively, this embodiment may be further characterized in that, viewed from the reflector substrate for which a correction must be made, the cylindrical surface is concave, and in that the cylindrical axis is parallel to the plane through an optical axis of the device, in which plane the reflector extends at an acute angle to the optical axis.

In a device in which two sub-beams must be combined and which comprises only one colour-selective reflector, the correction element is placed in the path of a sub-beam which has traversed a reflector substrate.

In a device in which three sub-beams must be combined and which comprises two colour-selective reflectors, a separate correction element according to the invention may be arranged in each of the sub-beams traversing a substrate.

However, such a device is preferably characterized in that all sub-beams traverse the same substrate thickness and in that one correction element is arranged in the path of the composite beam.

It should be noted that it is proposed in the Abstract of Japanese Patent Application (JP-A) 5-27343 to render the astigmatism in the three sub-beams in a colour television projection apparatus equal by associating an extra substrate having the same thickness as the original substrate to each of the dichroic mirrors in such a way that each of the sub-beams passes a substrate twice on its path from the LCD panel to the projection lens system. It is noted in (JP-A) 5-27343 that the now equal astigmatism of the sub-beam can be corrected by the projection lens system, so that this system must be adapted. However, the astigmatism is now twice as large as the astigmatism in an apparatus in which no extra substrates are added to the dichroic mirrors, so that the required correction is more difficult to realise.

A first embodiment of the device with two colour-selective reflectors in which the aberrations can be corrected by means of one correction element is characterized in that a transparent plate having the same product of refractive index and thickness as that of the reflector substrates is arranged in the path of only the sub-beam which does not traverse a reflector substrate.

A second embodiment of this device is characterized in that the colour-selective reflector passing a sub-beam and reflecting another sub-beam is arranged between two substrate plates each having a product of refractive index and thickness which is half that of the substrate plate of the other colour-selective reflector.

In this embodiment no more aberrations are supplied to the sub-beams than is absolutely necessary to render the aberrations of the three sub-beams equal, so that these aberrations can easily be corrected.

The invention further relates to a colour image projection apparatus comprising three primary image sources for supplying three differently coloured images of one scene, a beam recombination device for combining three sub-beams emitted by the image sources to one colour beam and a projection lens system for projecting this beam on a projection screen. This apparatus is characterized in that the beam recombination device is implemented as described hereinbefore.

The term scene should be considered to have a wide meaning and comprises a television image, graphic information, numerical information or a combination thereof. The primary image sources may be constituted by liquid crystalline picture display panels, picture display panels whose operation is based on dispersion, for example PDLC (Polymer Dispersed Liquid Crystal), panels comprising a matrix of small mirrors, referred to as DMDs (Digital Mirror Devices), or cathode ray tubes.

BRIEF DESCRIPTION OF THE DRAWINGS

These and other aspects of the invention will be apparent from and elucidated with reference to the embodiments described hereinafter.

In the drawings

DETAILED DESCRIPTION OF THE PREFERRED EMBODIMENTS

Figure 1:
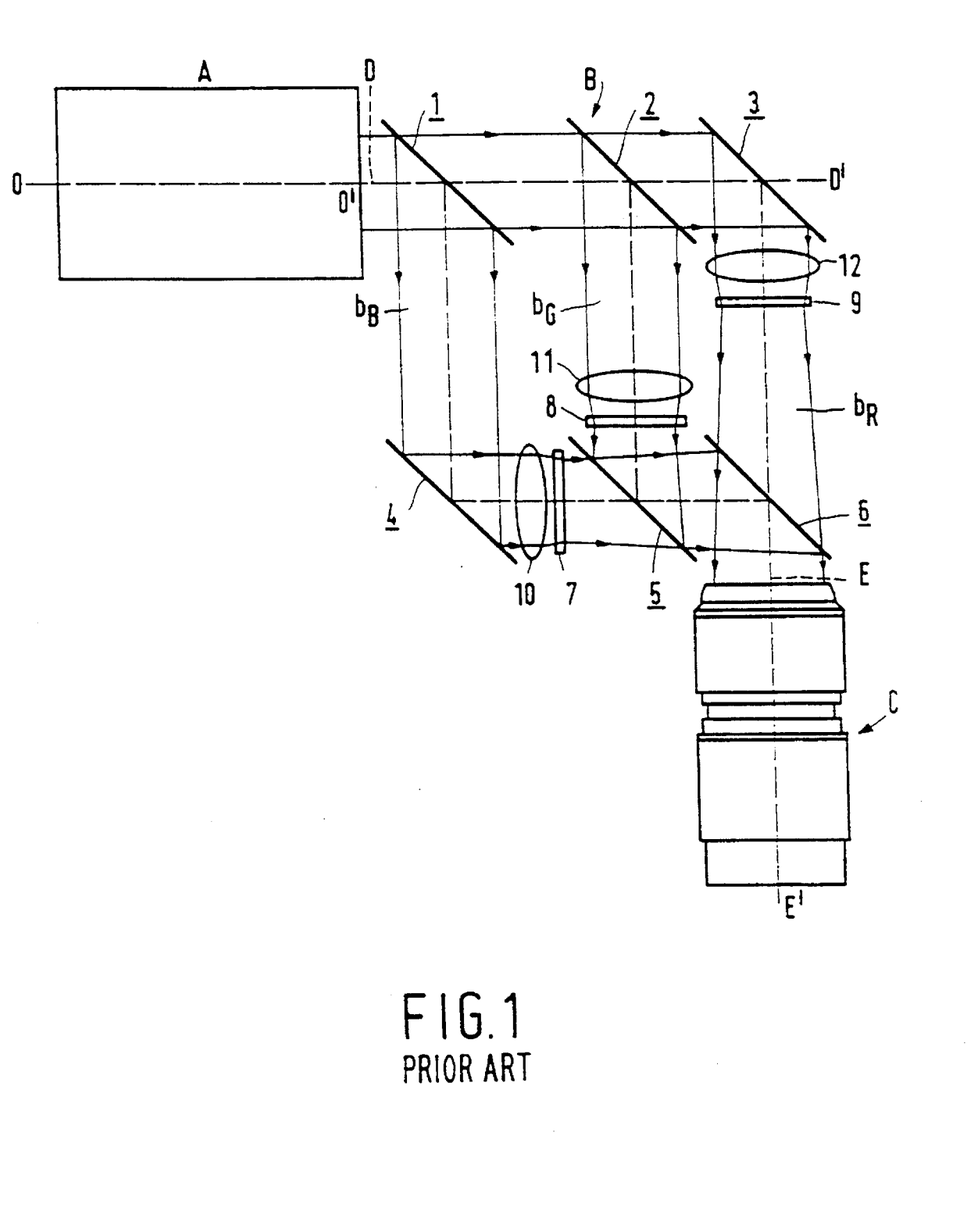
FIG. 1 shows diagrammatically a colour image projection apparatus in which the invention can be used.

FIG. 1 shows diagrammatically an embodiment of a colour projection television apparatus. This apparatus comprising three main sections: the illumination system A, the image display system B and a projection lens system, for example a zoom lens C. The principal axis 00' of the illumination system is in alignment with the optical axis DD', which is first divided into three sub-axes in the shown embodiment for colour projection, which sub-axes are later joined to one optical axis coinciding with the optical axis EE' of the projection lens system.

The beam coming from the illumination system A is incident on a colour-selective reflector 1, for example a dichroic mirror which reflects, for example the blue colour components $b_B$ and transmits the rest of the beam. This beam portion reaches a second colour-selective reflector 2 which reflects the green colour component $b_G$ and transmits the remaining red colour component $b_R$ to a reflector 3 which reflects the red beam towards the projection lens system. The reflector 3 may be a neutral reflector or a reflector which is optimized for red light. The blue beam is reflected by a neutral or blue-selective reflector 4 to a display panel 7 in the form of a liquid crystalline panel. This panel is electronically driven in known manner so that the blue component of the image to be projected appear on this panel. The beam modulated with the blue information reaches the projection lens system C via a colour-selective reflector 5 which passes the blue beam and reflects the green beam, and a further colour-selective reflector 6 which reflects the blue beam. The green beam $b_G$ traverses a second display panel 8 where it is modulated with the green image component and is then reflected towards the projection lens system C successively by the colour-selective reflectors 5 and 6. The red beam $b_R$ traverses a third display panel 9 where it is modulated with the red image component and subsequently reaches the projection lens system via the colour-selective reflector 6.

The blue, red and green beams are superimposed at the entrance pupil of this lens system so that a colour image is produced which is imaged by this system in a magnified form on a projection screen which is not shown in FIG. 1.

The optical path lengths between the output of the illumination system A and each of the display panels 7, 8 and 9 are preferably equal so that the cross-section of the beams $b_B$, $b_G$ and $b_R$ are equal at the area of their display panel. Also the optical path lengths between the display panels 7, 8 and 9 and the entrance aperture of the projection lens system are preferably equal so that the differently coloured scenes are satisfactorily superimposed on the projection screen.

Additional lenses 10, 11 and 12 may be arranged in front of the display panels 7, 8 and 9, which lenses ensure that all radiation from the exit face of the illumination system is concentrated in the entrance pupil of the projection lens system C.

Figure 2:
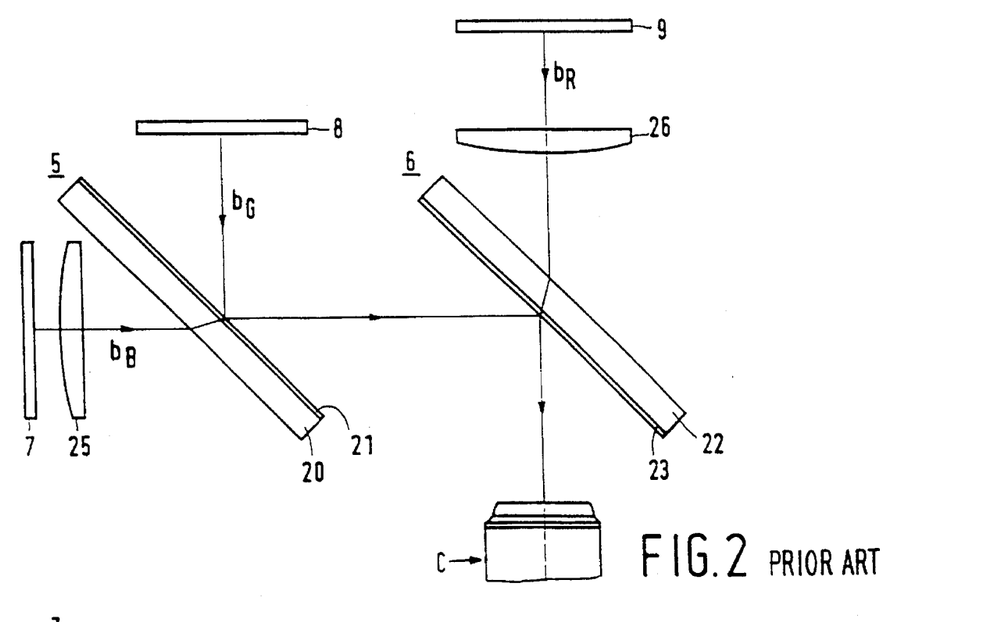
FIG. 2 shows a known beam recombination device for use in this apparatus.

FIG. 2 shows a conventional beam recombination device in detail. The colour-selective reflectors 5 and 6 comprise reflecting layers 21 and 23 provided on transparent, for example glass substrates 20 and 22, respectively. The green sub-beam $b_G$ from the panel 8 is reflected by the reflecting layer 21 and the reflecting layer 23 on its path to the projection lens system C without traversing one of the substrates 20 and 22. The red and blue sub-beams $b_R$ and $b_B$ each traverse a substrate 22 and 20, respectively, once so that astigmatism is introduced into these sub-beams. This astigmatism may be corrected by arranging a cylindrical lenses 25, 26 in the path of the sub-beams $b_B$ and $b_R$, respectively. The cylindrical axes of these lenses are perpendicular to the plane of the drawing in FIG. 2. By suitable choice of the power and position of the lenses 25, 26, the astigmatism introduced by these lenses into the sub-beams $b_B$ and $b_R$, respectively, can be rendered equal and opposite to the astigmatism introduced by the substrates 20 and 22 into the sub-beams $b_B$ and $b_R$, respectively.

However, only astigmatism can be corrected with such a cylindrical lens, but not other aberrations which may also be produced upon passage through an obliquely arranged substrate. Notably coma in the imaging sub-beams may degrade the quality of the projected image.

Figure 3:
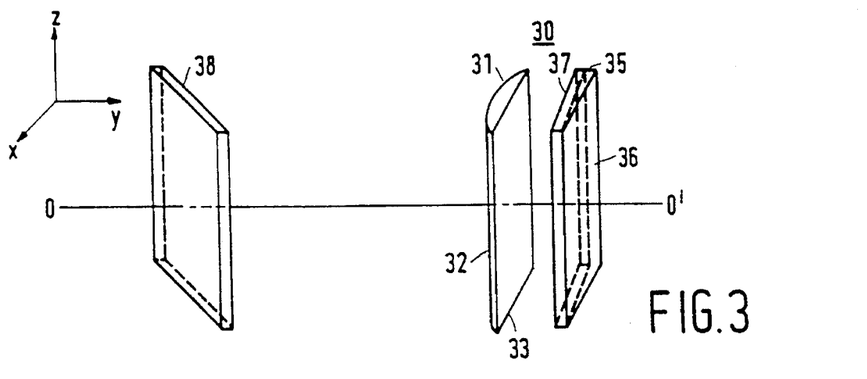
FIGS. 3, 4, 5, 6, 7 and 8 show embodiments of a composite correction element according to the invention for use in this device.

The present invention provides a correction element with which not only astigmatism but also other aberrations can be corrected. An embodiment of this element is shown in FIG. 3. For the purpose of orientation this Figure also shows the substrate causing the astigmatism for which a correction must be made, and a system of coordinates xyz. In the xy plane the substrate extends at an acute angle, for example of 45° to the axis 00' of the sub-beam which passes through this substrate. This optical axis extends in the y direction. The correction element 30 comprises a cylindrical element 31 and a wedge 35. The cylindrical axis of the lens is parallel to the z direction and the cylindrical surface 32, which is convex, faces the substrate 38. The flat rear side 33 of the lens is perpendicular to the optical axis. The front face 37 of the wedge 35 is perpendicular to the optical axis, while the rear face 36 extends at an acute angle to this axis, viewed in the xy plane. Instead of a flat rear plane, the cylindrical lens may alternatively have a curved rear surface.

Figure 4:
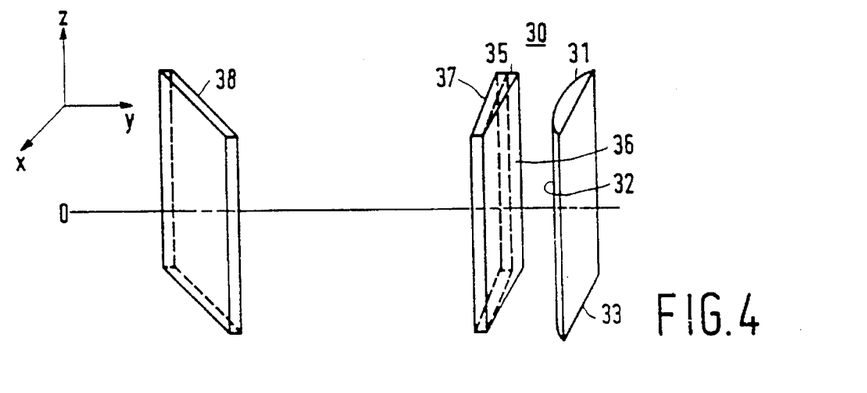

As is shown in FIG. 4, the cylindrical lens 31 and the wedge 35 may exchange positions.

Figure 5:
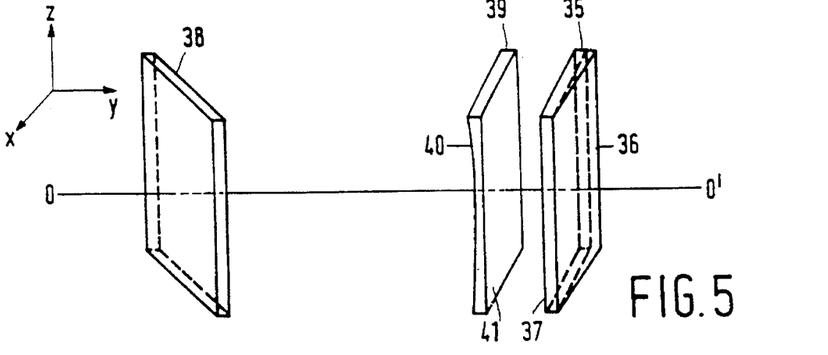

FIG. 5 shows an embodiment in which the cylindrical lens is a concave or negative lens 39 whose cylindrical surface 40 faces the substrate 38 again. However, now the cylindrical axis is parallel to the x direction. The wedge has the same orientation as that in FIGS. 3 and 4. For correcting off-axis aberrations, i.e. aberrations which may be produced in beam portions extending at some distance from the axis, the wedge may be rotated about the optical axis 00'.

Figure 6:
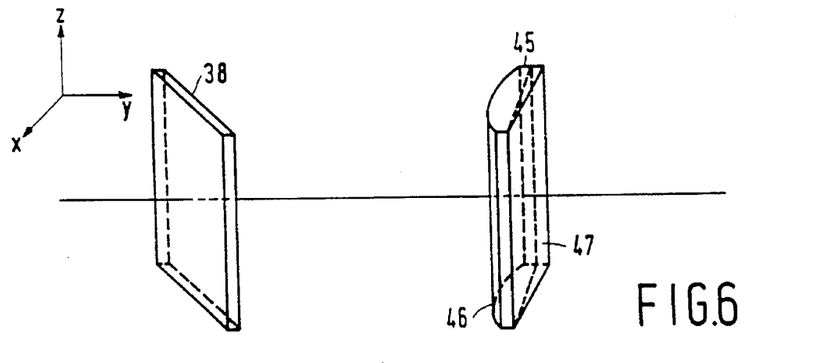

FIG. 6 shows a preferred embodiment of the correction element. The cylindrical lens and the wedge are now integrated to a wedge-shaped cylindrical lens 45 having a cylindrical front face 46 and an oblique rear face 47. The cylindrical surface may not only be convex but also concave again, as is shown in FIG. 5. Moreover, analogously to FIG. 4, the cylindrical surface 46 and the oblique surface 47 may exchange positions.

Figure 7:
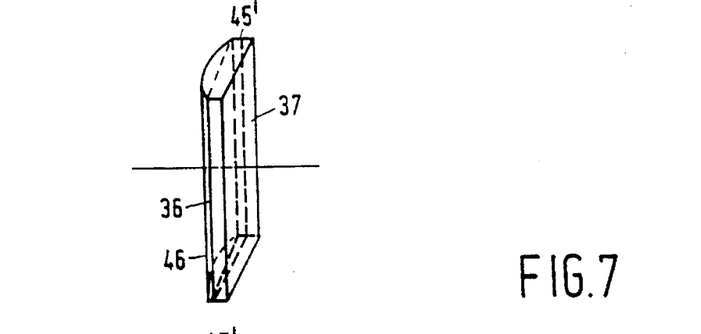

FIG. 7 shows an embodiment of the integrated correction element in which the cylindrical surface 46 is superimposed on the oblique surface 36 of the wedge. This superposition may aim be effected at the rear side instead of at the front sides, as is shown in FIG. 7.

Figure 8:
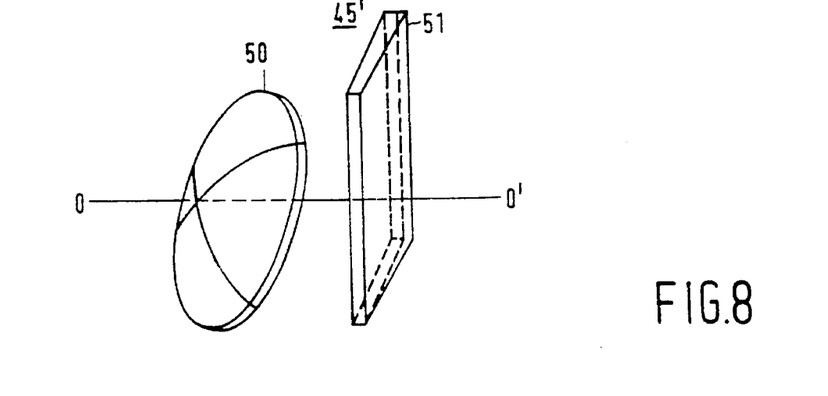

FIG. 8 shows a correction element 45' according to the invention which is composed of a spherical lens 50 and a wedge 51. The lens is arranged obliquely with respect to the optical axis 00' and may be used again for correcting astigmatism. Both astigmatism and coma can be corrected by means of the wedge and the spherical lens combined, and off-axis aberrations can be corrected by varying the orientation of, for example the wedge. The lens 50 and the wedge 51 may also be integrated in one element, while the spherical surface and the oblique wedge surface constitute two facing surfaces of the correction element or one superimposed surface at one side of the integrated element.

In the combinations hitherto described, the wedge may be replaced by a plane-parallel plate which, with respect to the optical axis, is arranged obliquely in an orientation opposite to that of the substrate for which a correction must be made. The wedge may alternatively be replaced by a prism having the same optical effect.

Figure 9:
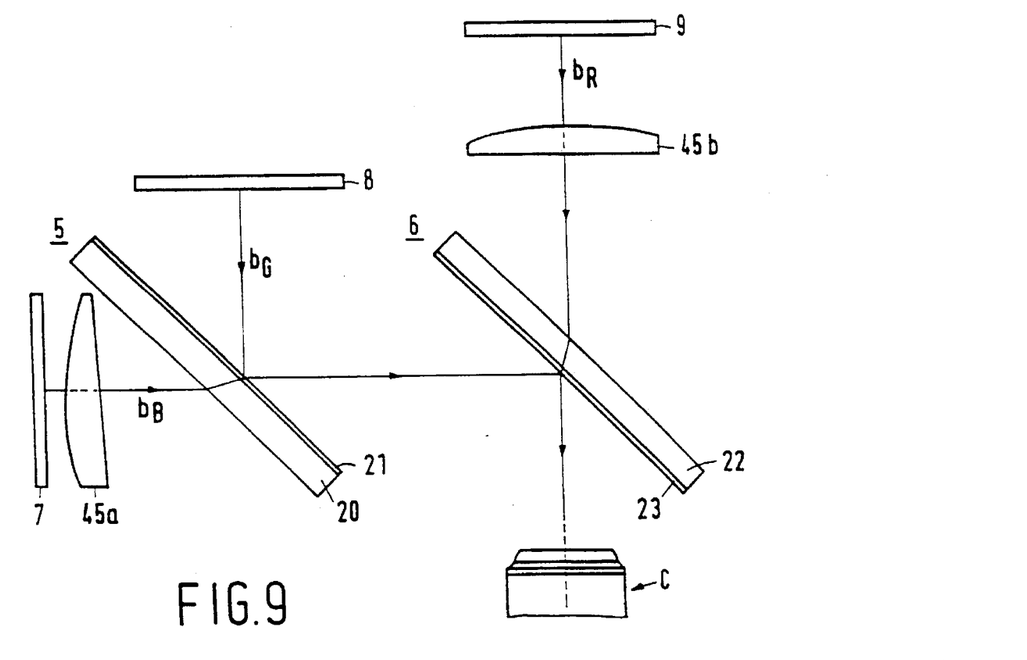
FIGS. 9, 10 and 11 show parts of embodiments of a colour image projection device according to the invention, with transmissive picture display panels.

Analogously to the device of FIG. 2, the novel correction element may be used for separately correcting the sub-beams $b_B$ and $b_R$ traversing a substrate, as is shown in FIG. 9. In this embodiment, for example wedge-shaped cylindrical lenses 45a and 45b identical to element 45 of FIG. 6 are arranged in the paths of the sub-beams $b_B$ and $b_R$.

Figure 10:
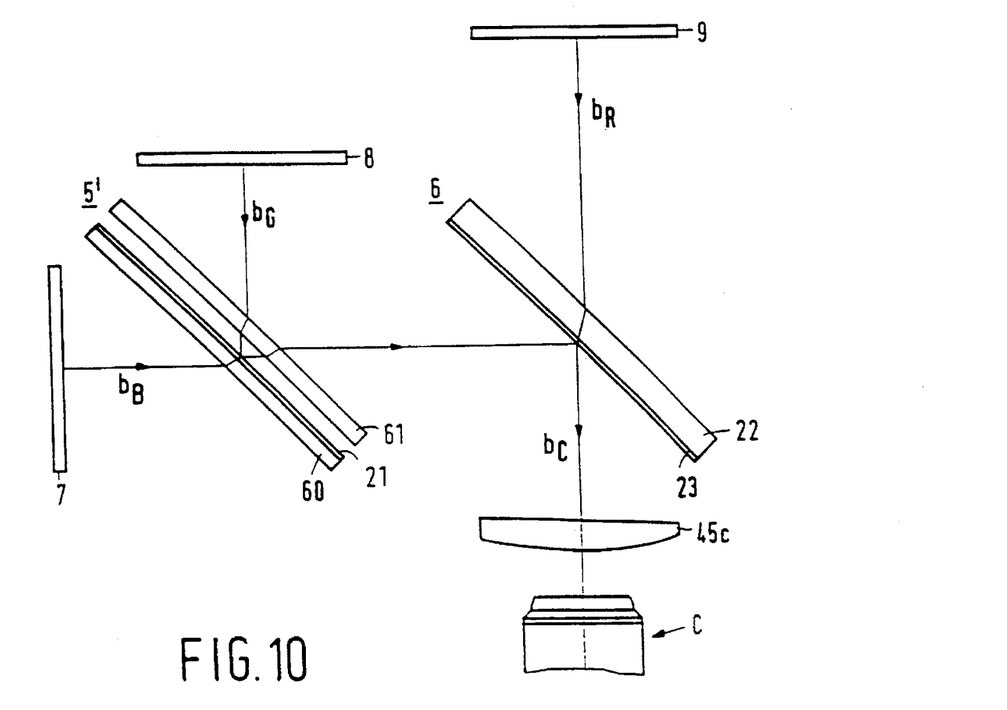

FIG. 10 shows a preferred embodiment of a beam recombination device in which only one correction element is used. This is possible because the aberrations in the three sub-beams have been rendered equal. To this end, the colour-selective layer 21 is provided on a substrate 60 whose thickness is half that of the substrate 22 of the element 6. A second substrate, or plate 61, having the same thickness as the substrate 60 is provided above the layer 21. On its path from the panel 8 the green sub-beam $b_G$ traverses the substrate 61, is subsequently reflected by the layer 21, then traverses the substrate 61 for the second time and is subsequently reflected towards the projection lens system C by the layer 23. The blue sub-beam $b_B$ first traverses the substrate 60 and subsequently the substrate 61 and is then reflected by the layer 23. Consequently, the sub-beams $b_G$ and $b_B$ traverse a substrate thickness twice, which thickness is equal to half the thickness of the substrate 22 which is traversed by the red sub-beam $b_R$ so that all sub-beams effectively traverse substrates of equal thicknesses and at the same angle. The same aberrations are introduced into these sub-beams, which aberrations are equal to those in the beams $b_R$ and $b_G$ in the device of FIG. 2. Since the aberrations in the three sub-beams are equal, they can be corrected by one element, such as the wedge-shaped cylindrical lens 45c, in the path of the combined beam $b_C$. The beam recombination device with the correction element 45c constitutes a self-corrected device so that it can be accommodated in an apparatus without having to adapt further optical systems of this apparatus.

Figure 11:
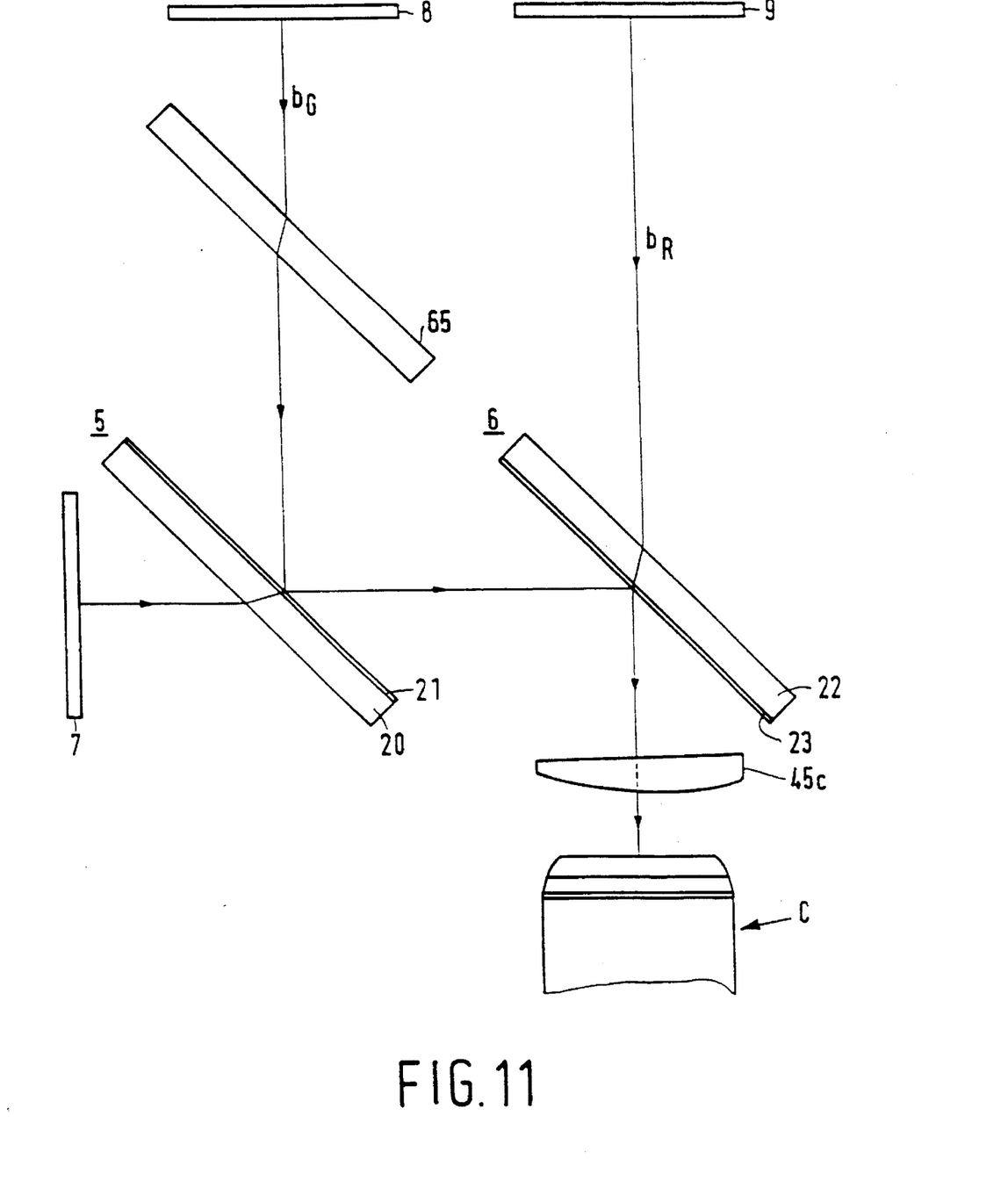

FIG. 11 shows a second possibility of rendering the aberrations of the three sub-beams equal, which possibility can be used if them is sufficient space between the panel 8 and the colour-selective reflector 5. Then, a plane-parallel plate 65 extending at the same angle and having the same refractive index and thickness as those of the substrates 20 and 22 of the reflectors 5 and 6 can be arranged in the path of the green sub-beam only. As compared with the embodiment of FIG. 10, the embodiment of FIG. 11 has the advantage that fewer false reflections may occur because there are fewer transitions between plate or substrate material and the surrounding medium.

Figure 12:
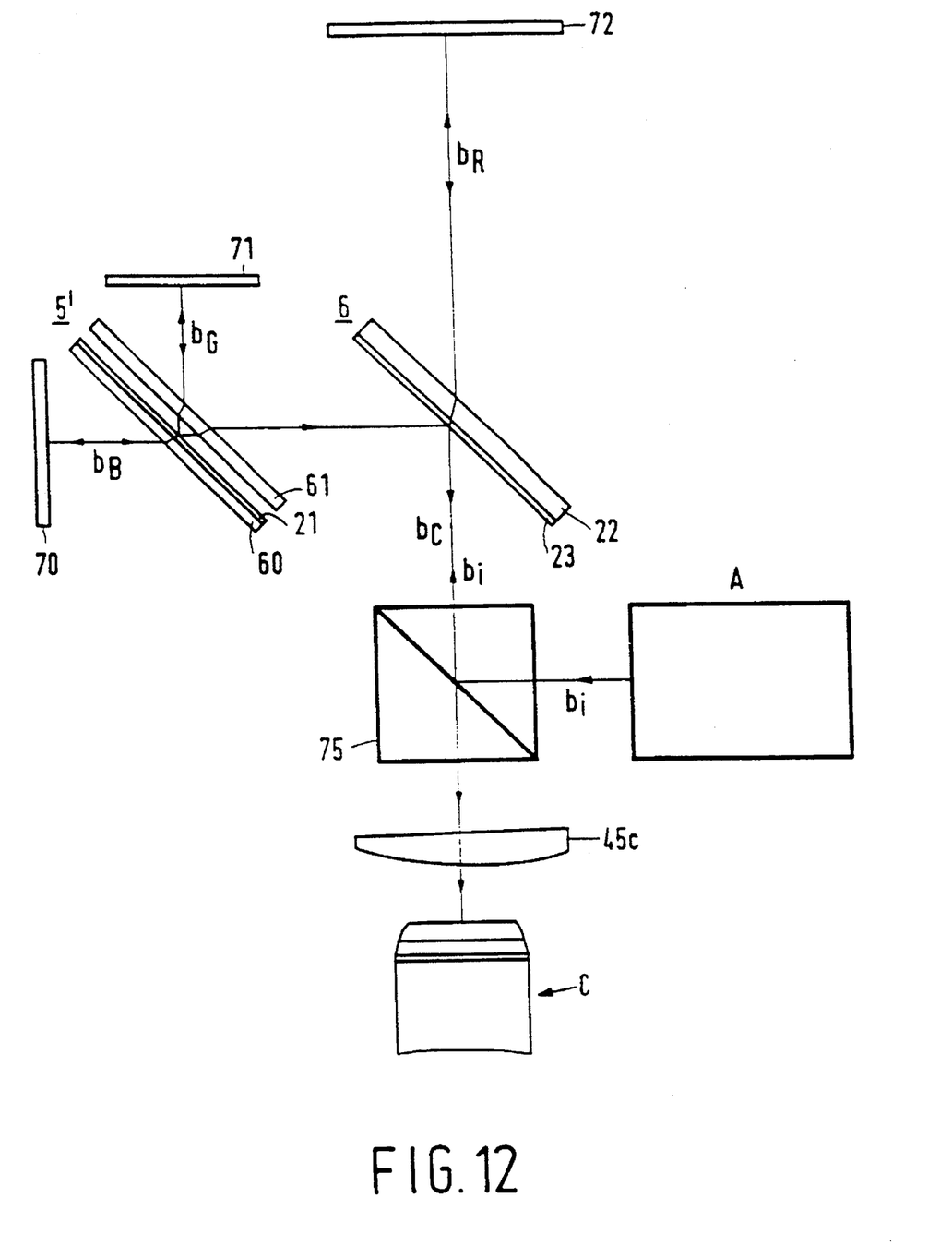
FIG. 12 shows a part of a colour image projection device according to the invention, with reflective picture display panels.

In the embodiments described in FIGS. 10, 11 and 12 the thickness itself and the refractive index itself of the plates 60, 61 and 65 need not be equal to, or half that of the parameters of the substrates 20 and 22, but it is sufficient when the product of refractive index and thickness of the plates is equal to or half this product for the substrates.

The invention may also be used in an image projection apparatus in which three cathode ray tubes are used for supplying the red, the green and the blue image. Such an apparatus resembles the device shown in FIGS. 10 and 11 in which, however, the panels 7, 8 and 9 are then replaced by cathode ray tubes. In this apparatus the illumination system A and the reflectors 1, 2, 3 and 4 of FIG. 1 are absent.

The invention may be further used in a colour image projection apparatus in which reflecting picture display panels are used, such as LCD panels having a reflector or panels comprising a matrix of tiltable mirrors which can be driven individually. The last-mentioned panels which are known under the name of DMD (Digital Mirror Device) are described inter alia in U.S. Pat. No. 4,615,595.

FIG. 12 shows the diagram of an embodiment of this apparatus in which the beam recombination device is also used as a beam-splitting device. After the foregoing description this device does not need any further explanation. To achieve that the sub-beams reflected by the panels 70, 71 and 72 are spatially separated from the sub-beams incident on these panels, it may be ensured, for example that the angle of incidence of the last-mentioned sub-beams is larger than zero degrees. To limit the dimensions of the projection apparatus, a beam-separating element 75 is preferably used, which reflects the beam $b_i$ coming from the illumination system A towards the panels and passes the combined beam be towards the projection lens system C. To minimize the loss of light, the element 75 is preferably implemented as a TIR (Total Internal Reflection) element as described in U.S. Pat. No. 4,969,730.

As already noted, the colour-selective elements 5 and 6 may be constituted by dichroic mirrors. In that case the layers 21 and 23 in FIGS. 10, 11 and 12 comprise a plurality of sub-layers having given refractive indices and given thicknesses, which sublayers jointly ensure that light of a given colour is passed and light of other colours is reflected. It is alternatively possible to use cholesteric filters as colour-selective reflectors, as described in the article "New Liquid Crystal Polarized Colour Projection Principle" in "Japanese Journal of Applied Physics", vol. 20, no. 10, October 1990, pp. 1974–1984. A cholesteric mirror has an optical layer of liquid crystalline material with a spiral or helix-like structure having a given pitch. Such a mirror reflects circularly polarized light having a direction of rotation which corresponds to the direction of rotation of the molecular helix and having a wavelength which is adapted to the pitch of the molecular helix, and which transmits light at other wavelengths.

Apart from its use in the apparatuses described above, the invention may generally be used in imaging optical systems in which sub-beams of different colours must be combined to one beam.

I claim:

1. An optical device for combining at least two sub-beams of different colours to one colour beam, said device comprising:

at least one colour-selective reflector arranged on a transparent plate-shaped substrate, wherein a first sub-beam is reflected from a surface of said at least one colour-selective reflector; and at least one correction element arranged in the path of a second sub-beam which traverses the substrate of said at least one colour-selective reflector, wherein the at least one correction element comprises a first sub-element chosen from the group consisting of cylindrical lens and obliquely arranged spherical lens, and said at least one correction element further comprises a second sub-element chosen from the group consisting of a plane-parallel plate arranged obliquely in an orientation opposite to that of the substrate, a wedge, and a prism, whereby the first and second sub-elements jointly correct for aberrations introduced by the substrate traversed by the second sub-beam.

2. The optical device as claimed in claim 1, wherein the first and the second sub-elements are integrated into one element.

3. The optical device as claimed in claim 2, further wherein the first and the second sub-elements are arranged on opposite sides of the integrated element.

4. The optical device as claimed in claim 2, further wherein the first and the second sub-elements are superimposed, one over the other, on a same surface of the integrated element.

5. The optical device as claimed in claim 1, wherein the first sub-element is arranged closer to the substrate of said at least one colour-selective reflector for which a correction must be made than the second sub-element.

6. The optical device as claimed in claim 1, wherein the second sub-element is arranged closer to the substrate of said at least one colour-selective reflector for which a correction must be made than the first sub-element.

7. The optical device as claimed in claim 4, wherein the surface having the first and second sub-elements superimposed thereon faces the substrate of said at least one colour-selective reflector for which a correction must be made.

8. The optical device as claimed in claim 4, wherein the surface having the first and second sub-elements superimposed thereon is remote from the substrate of said at least one colour-selective reflector for which a correction must be made.

9. A colour image projection apparatus comprising three primary image sources for supplying three differently coloured images of one scene, a beam recombination device for combining three sub-beams emitted by the image sources to one colour beam and a projection lens system for projecting said beam on a projection screen, wherein said beam recombination device is a device as claimed in claim 1.

10. An optical device for combining at least two sub-beams of different colours to one colour beam, said device comprising:

at least one colour-selective reflector arranged on a transparent plate-shaped substrate, wherein a first sub-beam is reflected from a surface of said at least one colour-selective reflector; and at least one correction element arranged in the path of a second sub-beam which traverses the substrate of said at least one colour-selective reflector, wherein the at least one correction element comprises a first sub-element chosen from the group consisting of cylindrical lens and obliquely arranged spherical lens, and said at least one correction element further comprises a second sub-element chosen from the group consisting of a plane-parallel plate, a wedge, and a prism, whereby the first and second sub-elements jointly correct for aberrations introduced by the substrate traversed by the second sub-beam, wherein the first sub-element is a cylindrical lens having an axis and a cylindrical surface and the second sub-element is an optical wedge.

11. The optical device as claimed in claim 10, further wherein, viewed from the substrate of said at least one colour-selective reflector for which a correction must be made, the cylindrical surface is convex, and further wherein the axis of the cylindrical lens is perpendicular to a plane through an optical axis of said device, in which plane said at least one colour-selective reflector extends at an acute angle to the optical axis.

12. The optical device as claimed in claim 10, further wherein, viewed from the substrate of said at least one colour-selective reflector for which a correction must be made, the cylindrical surface is concave, and further wherein the axis of the cylindrical lens is parallel to the plane through an optical axis of said device, in which plane said at least one colour-selective reflector extends at an acute angle to the optical axis.

13. A colour image projection apparatus comprising three primary image sources for supplying three differently coloured images of one scene, a beam recombination device for combining three sub-beams emitted by the image sources to one colour beam and a projection lens system for projecting said beam on a projection screen, wherein said beam recombination device is a device as claimed in claim 10.

14. An optical device for combining at least two sub-beams of different colours to one colour beam, said device comprising:

at least one colour-selective reflector arranged on a transparent plate-shaped substrate, wherein a first sub-beam is reflected from a surface of said at least one colour-selective reflector; and at least one correction element arranged in the path of a second sub-beam which traverses the substrate of said at least one colour-selective reflector, wherein the at least one correction element comprises a first sub-element chosen from the group consisting of cylindrical lens and obliquely arranged spherical lens, and said at least one correction element further comprises a second sub-element chosen from the group consisting of a plane-parallel plate, a wedge, and a prism, whereby the first and second sub-elements jointly correct for aberrations introduced by the substrate traversed by the second sub-beam, wherein said at least one colour-selective reflector comprises a plurality of at least two colour-selective reflectors, wherein each colour-selective reflector of said plurality of at least two colour-selective reflectors is arranged on a transparent plate-shaped substrate, further wherein said at least one correction element comprises an equally large number of correction elements as said plurality of at least two colour-selective reflectors, one correction element of which is each time arranged in the path of a sub-beam which traverses a substrate of one of said plurality of at least two colour-selective reflectors.

15. A colour image projection apparatus comprising three primary image sources for supplying three differently coloured images of one scene, a beam recombination device for combining three sub-beams emitted by the image sources to one colour beam and a projection lens system for projecting said beam on a projection screen, wherein said beam recombination device is a device as claimed in claim 14.

16. An optical device for combining at least two sub-beams of different colours to one colour beam, said device comprising:

at least one colour-selective reflector arranged on a transparent plate-shaped substrate, wherein a first sub-beam is reflected from a surface of said at least one colour-selective reflector; and at least one correction element arranged in the path of a second sub-beam which traverses the substrate of said at least one colour-selective reflector, wherein the at least one correction element comprises a first sub-element chosen from the group consisting of cylindrical lens and obliquely arranged spherical lens, and said at least one correction element further comprises a second sub-element chosen from the group consisting of a plane-parallel plate, a wedge, and a prism, whereby the first and second sub-elements jointly correct for aberrations introduced by the substrate traversed by the secnod sub-beam, wherein said at least one colour-selective reflector comprises a plurality of at least two colour-selective reflectors, wherein each colour-selective reflector of said plurality of at least two colour-selective reflectors is arranged on a transparent plate-shaped substrate of a prescribed thickness such that all sub-beams which traverse a substrate traverse a same substrate thickness and further wherein said at least one correction element comprises one correction element arranged in the path of a composite beam of all sub-beams.

17. The optical device as claimed in claim 16, further comprising a transparent plate having a same product of refractive index and thickness as that of the substrates of said plurality of at least two colour-selective reflectors and wherein said transparent plate is arranged in the path of a sub-beam which does not traverse a substrate of said plurality of at least two colour-selective reflectors.

18. The optical device as claimed in claim 16, wherein said plurality of at least two colour-selective reflectors comprises two colour-selective reflectors, wherein a first colour-selective reflector comprises a colour-selective reflector for passing a sub-beam and further for reflecting another sub-beam, the first colour-selective reflector further being arranged between two substrate plates, each substrate plate having a product of refractive index and thickness which is half that of the substrate plate of the other colour-selective reflector.

19. A colour image projection apparatus comprising three primary image sources for supplying three differently coloured images of one scene, a beam recombination device for combining three sub-beams emitted by the image sources to one colour beam and a projection lens system for projecting said beam on a projection screen, wherein said beam recombination device is a device as claimed in claim 16.

* * * * *